(12) United States Patent
Taher

(10) Patent No.: US 11,607,866 B2
(45) Date of Patent: Mar. 21, 2023

(54) HYBRID IONIC GRAPHENE NANOCOMPOSITE WITH LAYERED STRUCTURE

(71) Applicant: GraphMaTech AB, Uppsala (SE)

(72) Inventor: Mamoun Taher, Västerås (SE)

(73) Assignee: GraphMaTech AB, Uppsala (SE)

( * ) Notice: Subject to any disclaimer, the term of this patent is extended or adjusted under 35 U.S.C. 154(b) by 74 days.

(21) Appl. No.: 16/647,036

(22) PCT Filed: Sep. 14, 2018

(86) PCT No.: PCT/SE2018/050933
§ 371 (c)(1),
(2) Date: Mar. 13, 2020

(87) PCT Pub. No.: WO2019/054931
PCT Pub. Date: Mar. 21, 2019

(65) Prior Publication Data
US 2020/0254726 A1    Aug. 13, 2020

(30) Foreign Application Priority Data
Sep. 14, 2017   (SE) .................... 1751123-9

(51) Int. Cl.
*B32B 7/04* (2019.01)
*B32B 9/00* (2006.01)
(Continued)

(52) U.S. Cl.
CPC ........ *B32B 9/007* (2013.01); *B32B 2305/024* (2013.01); *B32B 2305/30* (2013.01); *B82Y 30/00* (2013.01); *B82Y 40/00* (2013.01)

(58) Field of Classification Search
CPC ......... B32B 3/06; B32B 7/04; B32B 2313/02; B32B 2313/04
See application file for complete search history.

(56) References Cited

U.S. PATENT DOCUMENTS

| | | | | |
|---|---|---|---|---|
| 5,660,947 A | * | 8/1997 | Wuhr ................ | H01M 10/0568 429/307 |
| 6,924,066 B2 | * | 8/2005 | Heider .............. | H01M 10/0567 429/307 |

(Continued)

FOREIGN PATENT DOCUMENTS

| EP | 2180539 A1 | 4/2010 |
|---|---|---|
| WO | 2011/029006 A2 | 3/2011 |

(Continued)

OTHER PUBLICATIONS

Gusain et al., "Covalently attached graphene-ionic liquid hybrid nanomaterials: synthesis, characterization and tribological application", J. Mater. Chem. A, 2016, 4, 926-937.

(Continued)

*Primary Examiner* — Hoa (Holly) Le
(74) *Attorney, Agent, or Firm* — Morgan, Lewis & Bockius LLP

(57) ABSTRACT

A material can have a layered structure with at least a first layer, including a carbon-based material or a substrate of a material other than a carbon-based material, a second layer, including a carbon-based material, and a third, intermediate layer that separates and interconnects the first and second layers. The carbon-based material includes at least 50 at. % carbon, has a hexagonal lattice and the layer or layers including the carbon-based material has/have a thickness of 1-20 times the size of a carbon atom. The intermediate layer is a layer that includes a salt having ions that include at least two separate cyclic, planar groups that are capable of forming π-π-stacking with the material of the second layer and that the third, intermediate layer is connected to at least the second layer by π-π-stacking caused by said cyclic planar groups of the salt ions.

20 Claims, 7 Drawing Sheets

(51) Int. Cl.
*B82Y 30/00* (2011.01)
*B82Y 40/00* (2011.01)

(56) References Cited

U.S. PATENT DOCUMENTS

| | | | |
|---|---|---|---|
| 9,388,049 B2 | 7/2016 | Lee | |
| 9,484,158 B2 | 11/2016 | Aksay et al. | |
| 2003/0228524 A1* | 12/2003 | Heider | H01M 10/0567 |
| | | | 429/324 |
| 2014/0370274 A1 | 12/2014 | Lee | |
| 2015/0337104 A1 | 11/2015 | Brewer et al. | |
| 2016/0264814 A1* | 9/2016 | Lobez Comeras | C01B 32/194 |
| 2017/0200938 A1* | 7/2017 | Zhamu | H01M 4/587 |

FOREIGN PATENT DOCUMENTS

| | | |
|---|---|---|
| WO | 2014/200232 A1 | 12/2014 |
| WO | 2015/189335 A1 | 12/2015 |

OTHER PUBLICATIONS

Yang et al., "Bioinspired Effective Prevention of Restacking in Multilayered Graphene Films: Towards the Next Seneration of High-Performance Supercapacitors", Adv. Mater., 2011, 23, 2833-2838.

Kim et al., "High-performance supercapacitors based on poly(ionic liquid)-modified graphene electrodes", ACS Nano, 2011, 5, 1, 436-442.

Liu et al., "Graphene-Based Supercapacitor with an Ultrahigh Energy Density", Nano Lett., 2010, 10, 12, 4863-4868.

Katinonkul et al., "The first synthesis of a graphite bis(oxalato)borate intercalation compound", J. of Phys. and Chem. of Solids, 68 (3), 2007, 394-399.

International Search Report and Written Opinion issued in corresponding International Patent Application No. PCT/SE2018/050933, dated Nov. 9, 2018.

Extended European Search Report issued in corresponding European Patent Application No. 18856365.4, dated Jul. 30, 2021.

\* cited by examiner

HYBRID IONIC GRAPHENE NANOCOMPOSITE WITH LAYERED STRUCTURE

TECHNICAL FIELD

The present disclosure relates to the field of chemistry, and in particular to carbon-based multilayer materials comprising one or more intermediate layers interconnecting the carbon-based layers or connecting a carbon-based layer to a substrate other than said carbon-based layer.

BACKGROUND

Graphene is generally defined as an atom thick planar sheet of carbon atoms arranged in a hexagonal lattice structure. It has emerged as a very promising material due to its outstanding properties such as high electrical and thermal conductivity, excellent mechanical strength and a large surface area. Graphene has attracted great attention for different industrial applications such as flexible electronics, super capacitors, sensors and etc.

Ionic liquids (ILs) are salts that have a low melting temperature, and are preferably liquid at room temperature. They are sometimes referred to as "designer salts" and have attracted significant attention due to their tunable physicochemical properties, such as negligible vapour pressure, high thermal stability and conductivity, ionic conductivity and high polarities. Ionic liquids have been investigated as potential materials for different applications such as energy storage, solar cells, carbon dioxide capturing, lubricants, filters etc.

The functionalization of graphene-related materials with ionic liquids is a topic of great interest. One goal is to develop functional hybrid nanomaterials that exhibit task-specific properties besides the individual properties of their constituent materials/elements. Such nanocomposites have potential for sensors, catalysts, dye sensitized solar cells, energy storage (batteries and supercapacitors), lubricant additives etc.

Numerous different applications have been suggested, such as a covalent functionalization of graphene by different ionic liquids for tribological applications (J. Mater. Chem. A 2016, 4, 926), graphene films for use in high-performance supercapacitors (Adv. Mater. 2011, 23, 2833), high-performance supercapacitors based on poly(ionic liquid)-modified graphene electrodes (ACS Nano 2011, 5, 436), graphene-based supercapacitors with an ultrahigh energy density (Nano Lett. 2010, 10, 4863), and the intercalation of anions between exfoliated graphite flakes, in particular intercalation of lithium bis(oxalato)borate (J of Phys. and Chem. of Solids 68 (2007) 394-399). The anion is intercalated with its oxide head groups oriented towards the graphite and with fluoride anions co-intercalated.

Further, U.S. Pat. No. 9,484,158 discloses a method for making a graphene-ionic liquid composite, and resulting graphene-ionic liquid composite electrodes for energy storage applications.

WO 2011/029006 A2 discloses ionic liquids for use in ultracapacitors and graphene-based ultracapacitors.

As evident from the above examples, there are numerous possible applications in which the properties of graphene could be taken advantage of. However, many applications will require that a plurality of graphene layers are interconnected in order to form a material of sufficient thickness to withstand the external impact that it might be subjected to in various applications.

It is well-known that a single graphene sheet has superior properties. However, the properties of pure collective graphene products or graphene composites (for example graphene sheets with thin interlayers of so called modifiers, for example specific polymers) are significantly compromised by the weak inter-sheet interactions. Therefore, it remains a major challenge to design the interactions between adjacent graphene sheets and their modifiers as well as the interactions between graphene sheets and substrates of different natures (such as metallic and non-metallic) without degrading the properties of the graphene itself.

US2016264814 (International Business Machines Corp.) discloses a multilayer graphene structure including a first layer of graphene, a second layer of graphene; and an interstitial layer bonding the first layer of graphene to the second layer of graphene, wherein the interstitial layer comprises a polyaromatic compound.

U.S. Pat. No. 9,388,049 (Research & Business Foundation Sungkyunkwan University) discloses a method of producing reduced graphene oxide, said method involving forming a graphene oxide-dispersed solution comprising graphene oxide and a surfactant that comprises at least two aromatic functional groups, reducing the graphene oxide-dispersed solution to obtain a layered structure of reduced graphene oxide comprising the at least two aromatic functional groups, and dispersing the layered structure of reduced graphene oxide in a solvent to produce a multi-layered reduced graphene oxide.

WO 2015/189335 (Centre National de la Rechereche Scientifique, CNRS) discloses a method for preparing aqueous or organic suspensions of fully exfoliated nanocarbon materials, comprising the steps of:
a) dissolving a nanocarbon intercalation compound in an aprotic organic solvent (A) or a mixture (A') of aprotic organic solvents under inert atmosphere; thereby leading to an organic solution of reduced nanocarbon;
b) re-oxidation (removal of electrons) to revert the reduced nanocarbon material to its neutral state to lead to an organic suspension of neutral nanocarbon material in the organic solvent (A) or a mixture (A') of aprotic organic solvents; and
c) mixing the organic suspension of neutral nanocarbon obtained in step b) with a suitable amount of degassed water, degassed ionic aqueous solution, degassed organic solvent (B), degassed mixture (B') of organic solvents, or degassed mixture of (B) or (B') with water or an aqueous ionic solution;
wherein solvent (A) or solvent mixture (A') is fully or partially water-miscible or fully or partially miscible with solvent (B) or solvent mixture (B'); thereby leading to an air-metastable aqueous or organic suspension of nanocarbon material.

The hitherto known approaches are however unsuccessful or insufficiently successful in producing multi-layered carbon-based structures, in particular multi-layered graphene structures that solve the agglomeration between graphene flakes.

One object of the present invention is to present a multilayer carbon-based material including a first layer comprising a carbon-based material or a substrate of another material than said carbon-based material, and a second layer of a carbon-based material, wherein the carbon-based layer or layers have a thickness sufficiently low to present at least some of the superior properties of graphene and the intermediate layer achieves reliable bonding between the layers, or between a carbon-based layer and a substrate other than a carbon-based layer. The intermediate layer should also provide a sufficient separation between the carbon-based layers.

Other problems and objects of the invention, the corresponding solutions, and their advantages will become apparent to a skilled person from the following disclosure, examples and claims.

SUMMARY

The above object and others are achieved by the below aspects and embodiments, as defined in the following description, examples and claims.

A first aspect relates to a material having a layered structure comprising
a first layer, comprising a carbon-based material or a substrate of a material other than said carbon-based material,
a second layer, comprising said carbon-based material, and
a third, intermediate layer that separates and interconnects the first and second layers, wherein
said carbon-based material comprises at least 50 atomic percent carbon, has a hexagonal lattice and wherein the layer or layers comprising said carbon-based material has/have a thickness of 1-20 times the size of a carbon atom, wherein
said at least one intermediate layer is a layer comprising a salt that has ions comprising at least two cyclic, planar groups capable of forming π-π-stacking interaction with the material of at least the second layer, and that
the third, intermediate layer is connected to at least the second layer by π-π-stacking interaction caused by said cyclic planar groups of the salt ions.

The cyclic, planar groups may be referred to as ring-shaped, flat groups. Preferably they may comprise rings with five or more atoms defining said ring, such as imidazole rings or benzene groups. The layer or layers of carbon-based material may be continuous or discontinuous. The salt may also be referred to as an ionic compound.

The layer or layers of carbon-based material may comprise a plurality of separate flakes that form a layer together with each other, either by being connected to each other, and for example overlapping each other to some extent, or by being located beside each other with generally parallel extension planes.

The material of the present invention may, according to one embodiment, comprise a plurality of layers of said carbon-based material, wherein said layers are separated and interconnected by a corresponding plurality of layers corresponding to said third intermediate layer as defined hereinabove and hereinafter, said plurality of second layers and third layers forming a stack of layers wherein said stack of layers defines a thickness of the material with the layered structure.

According to one embodiment, the thickness is at least 10 nm. An end layer may comprise a substrate of a material other than said carbon-based layer, and may, according to one embodiment, consist of a metal-based material. As already mentioned, the substrate then forms a first layer onto which a stack of second layers, interconnected by intermediate, third layers, is connected by an intermediate third layer as defined hereinabove and hereinafter. The first layer may comprise a carbon-based material which does not fall under the definition of the carbon-based material that forms the second layer. If the first layer is of a material other than said carbon-based material, as defined in the claims and herein, for example a metallic substrate, additional or other interactions (electrostatic, ionic, covalent bonding, hydrogen bonding, Van der Waals) might be also involved besides or as an alternative to π-π-stacking. According to one embodiment, both the first and the second layers comprise said carbon-based material, and the intermediate layer is connected to both the first and the second layers by π-π-stacking interaction caused by said cyclic planar groups of the salt ions.

In theory, the first and second layers may comprise carbon-based materials that both fall under the definition of such a material as presented hereinabove, but which are slightly different in terms of composition and/or thickness. If the material comprises a stack of second layers interconnected by third layers, the thicknesses of the individual layers may be different, but still within the limits given by the inventive idea as defined hereinabove and in the claims. Preferably, said third, intermediate layer consists solely of said salt.

According to one embodiment, the cyclic planar groups of said ions of said salt comprises at least one aromatic group.

According to one embodiment, each of said cyclic planar groups of said ions of said salt is an aromatic group.

According to one embodiment, the first layer comprises a metal substrate. According to one embodiment, the metal substrate comprises as a main constituent any of the following metals or their alloys; Fe, Au, Ag, Al, Cu, Ti, Ni.

According to one embodiment, each carbon-based layer has a thickness of 1-10 times the size of a carbon atom. Thereby, the likeliness of the carbon-based layer having at least some of the superior properties characteristic of graphene is further improved compared to if the layer is thicker.

According to one embodiment, the thickness of the third, intermediate layer is below 20 nm. A too thick intermediate layer between the first and second layers will result in degradation of some of the properties, e.g. the mechanical strength of the hybrid ionic graphene nanocomposite.

According to one embodiment, the carbon-based material comprises at least 99 atomic percent carbon atoms.

According to one embodiment, said ions of the salt consist of a tetra-coordinated ionic compound. Salts with tetra-coordinated ionic compounds have resulted in very good bonding by π-π-stacking interaction to the type of carbon-based material disclosed hereinabove and hereinafter. According to one embodiment the cyclic planar groups of said ions of said salt comprises at least two aromatic groups. According to one embodiment, one of the ions of said salt comprises at least two aromatic groups. According to one embodiment, the at least two aromatic groups are arranged on either end of the ion, relative to its charged centre.

According to one embodiment, said salt is described by the following general formula

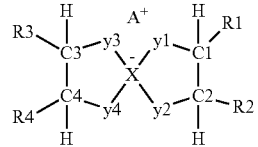

wherein
$X^-$ is any element from the periodic table that has the possibility to chelate resulting in an anionic nature,
y1, y2, y3, y4 is any one of O, S, Si, C, N and P,
R1, R2 are hydrocarbon chains, at least one of which is aromatic,
R3, R4 are hydrocarbon chains, at least one of which is aromatic, R1 and R2 form an aromatic ring with C1 and C2,
R3 and R4 form an aromatic ring with C3 and C4,
H is hydrogen or a carbonyl group,
wherein the combination of X, H, y1, y2, y3, y4, R1, R2, R3, R4, C1, C2, C3 and C4 defines the anion of the salt, and $A^+$ is any cation capable of forming a salt in room temperature in combination with the anion.

It should thus be understood that an aromatic ring is formed by any of R1+C1, R2+C2 and R1+R2+C1+C2. Another ring is formed by any of R3+C3, R4+C4 and R3+R4+C3+C4.

According to one embodiment, not more than two H of the anion may comprise a carbonyl group, and that, if two H of the anion comprise a respective carbonyl group those carbonyl groups are located on opposite sides of a coordination defined by the anion.

According to one embodiment, X is any of boron (B) or aluminium (Al).

According to one embodiment, A is chosen from sodium (Na) and lithium (Li) and X is chosen from aluminium (Al) and boron (B), preferably boron (Br)

According to one embodiment, the salt is lithium bis(salicylato)borate [Li][BScB]. According to another embodiment, the salt is sodium bis(salicylate)borate [Na][BScB].

According to one embodiment, each carbon-based layer consists of graphene.

According to one embodiment, said material is a graphene lithium bis(salicylato)borate (G[Li][BScB]) nanocomposite. According to another embodiment, said material is a graphene sodium bis(salicylate)borate (G[Na][BScB]) nanocomposite.

Further features and advantages of the present invention will be disclosed in the following detailed description of embodiments.

BRIEF DESCRIPTION OF THE DRAWINGS

Different aspects and embodiments will be disclosed hereinafter with reference to the annexed drawing, in which.

DETAILED DESCRIPTION

Before the present invention is described, it is to be understood that the terminology employed herein is used for the purpose of describing particular embodiments only and is not intended to be limiting, since the scope of the present invention will be limited only by the appended claims and equivalents thereof.

It must be noted that, as used in this specification and the appended claims, the singular forms "a," "an," and "the" include plural referents unless the context clearly dictates otherwise.

The terms "layered" and "multi-layered" are used to describe constructs where two or more discrete layers having the same or different composition are arranged substantially parallel on top of each other, preferably with intermediate binding layers. The terms "first", "second" and "third" are only used to identify the layers.

"Substrate" denotes any material onto which a carbon-based layer or layers is/are applied. Suitable substrates include metallic, ceramic or thermoplastic materials, and combinations thereof.

The terms "metal" and "metallic" includes substantially pure metals as well as metal alloys.

Figure 1:
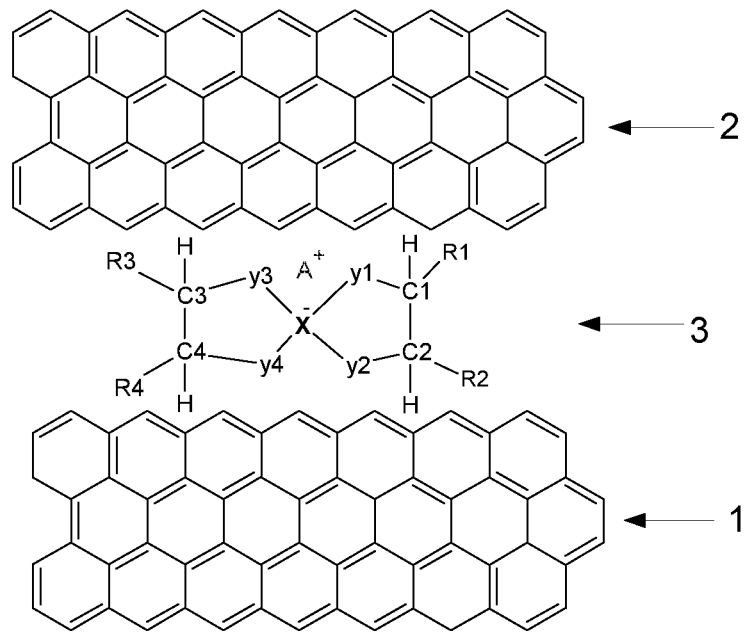
FIG. 1 is a schematic representation of a general structure of a hybrid ionic graphene nanocomposite according to one aspect.

FIG. 1 shows a general structure of material according to the present invention, and more precisely a hybrid ionic graphene nanocomposite according to the present invention. The material shown in FIG. 1 has a layered structure comprising; a first layer 1, comprising a carbon-based material or a substrate of a material other than said carbon-based material, a second layer 2, comprising said carbon-based material, and a third, intermediate layer 3 that separates and interconnects the first and second layers 1, 2. The carbon-based material comprises at least 50 atomic percent carbon atoms, and has a hexagonal lattice, and the layer or layers 1, 2 comprising said carbon-based material preferably has/have a thickness of 1-20 times the size of a carbon atom.

In FIG. 1, the first layer 1 comprises said carbon-based material. Furthermore, in the material shown in FIG. 1, the intermediate layer 3 is a layer consisting of a salt in which one of its ions, here the anion, comprises at least two separate cyclic, planar groups R1, R2, R3, R4 that are capable of forming π-π-stacking interactions with the materials of the first and second layers 1, 2. The third, intermediate layer 3 is connected to the first and second layers by π-π-stacking interaction caused by said cyclic planar groups R1, R2, R3, R4 of the salt ions.

The salt of the third layer has been obtained by means of the following general synthesis protocol:

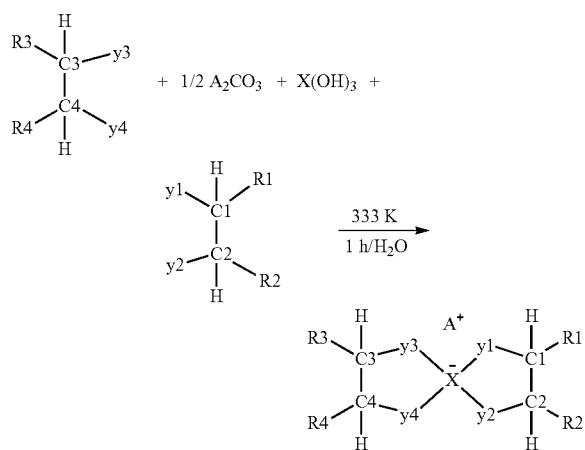

The constituents of the salt ions are as follows:

X— is any element from the periodic table that has the possibility to chelate resulting in an anionic nature, y1, y2, y3, y4 is any one of O, S, Si, C, N and P, R1, R2 are hydrocarbon chains, at least one of which is preferably aromatic, R3, R4 are hydrocarbon chains, at least one of which is preferably aromatic, R1 and R2 form an aromatic ring with C1 and C2, R3 and R4 form an aromatic ring with C3 and C4, H is hydrogen or a carbonyl group, wherein the combination of X, H, y1, y2, y3, y4, R1, R2, R3, R4, C1, C2, C3 and C4 defines the anion of the salt, and A+ is any cation capable of forming a salt in combination with the anion.

In a preferred embodiment, the salt is solid at room temperature e.g. lithium bis(salicylato)borate [Li][BScB].

Figure 2:
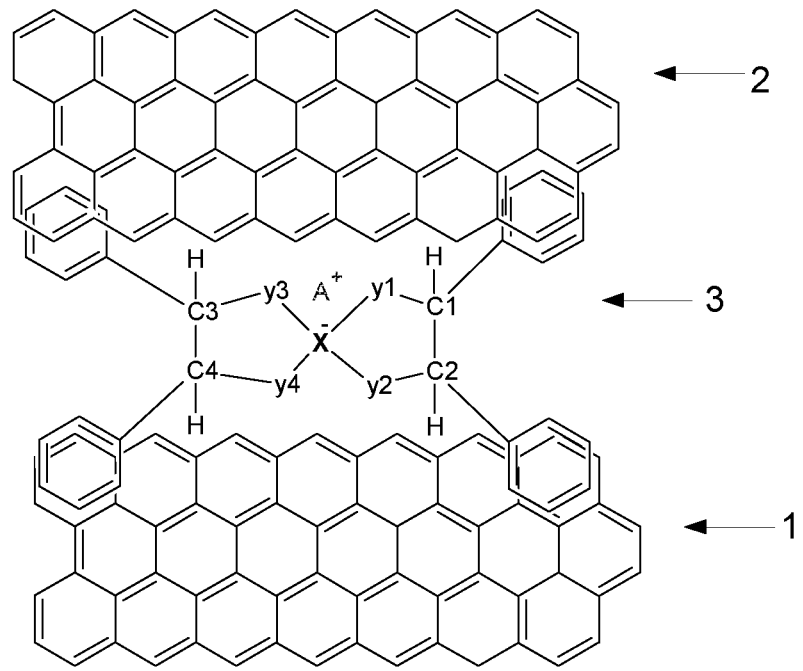
FIG. 2 shows a first embodiment of a hybrid ionic graphene nanocomposite.

FIG. 2 shows a first embodiment of the material according to the invention, in which the first layer 1 is formed by a graphene layer, having a thickness in the range of 1-10 times the size of a carbon atom, and the second layer 2 is formed by a graphene layer, having a thickness in the range of 1-10 times the size of a carbon atom. R1 forms a cyclic planar ring together with C1 that forms a π-π-stacking interaction with the material of the second layer 2. R2 forms a cyclic planar ring together with C2 that forms a π-π-stacking interaction with the material of the first layer 1. R3 forms a cyclic planar ring together with C3 that forms a π-π-stacking interaction with the material of the second layer 2. R4 forms a cyclic planar ring together with C4 that forms a π-π-stacking interaction with the material of the first layer 1. In a preferred embodiment, each cyclic planar ring formed by R1, R2, R3 and R4 is an aromatic ring.

Accordingly, in this embodiment the salt ion comprises four aromatic groups capable of forming a π-π-stacking interaction with the material of the first and second layers 1, 2. One or more ions of the ions of the salt bridges the distance between the first and second layers and at least one of the ions of the salt extends across the distance between the first and second layer.

Figure 3:
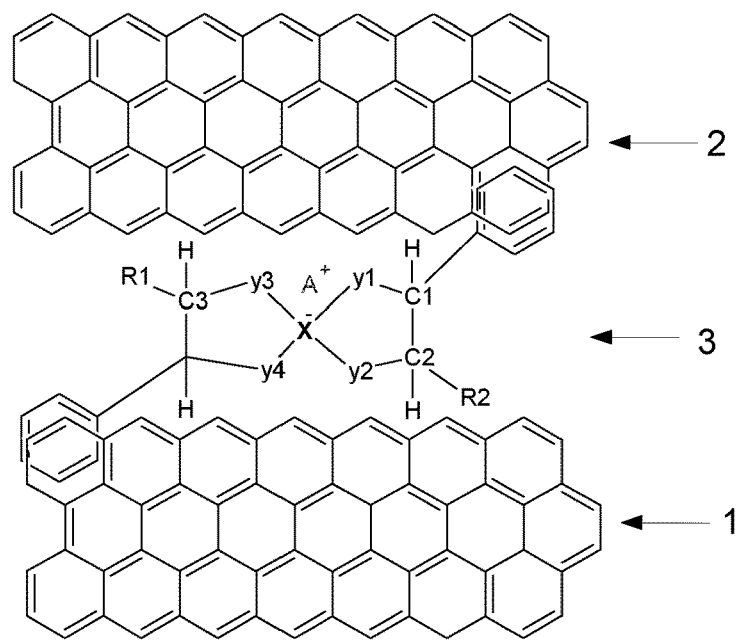
FIG. 3 shows a second embodiment of a hybrid ionic graphene nanocomposite.

FIG. 3 shows a second embodiment, in which R1 forms a cyclic planar ring that forms a π-π-stacking interaction with the material of the second layer 2, and R4 forms a cyclic planar ring together with C4 that forms a π-π-stacking interaction with the material of the first layer 1. Preferably, the cyclic planar rings are benzene rings.

Figure 4:
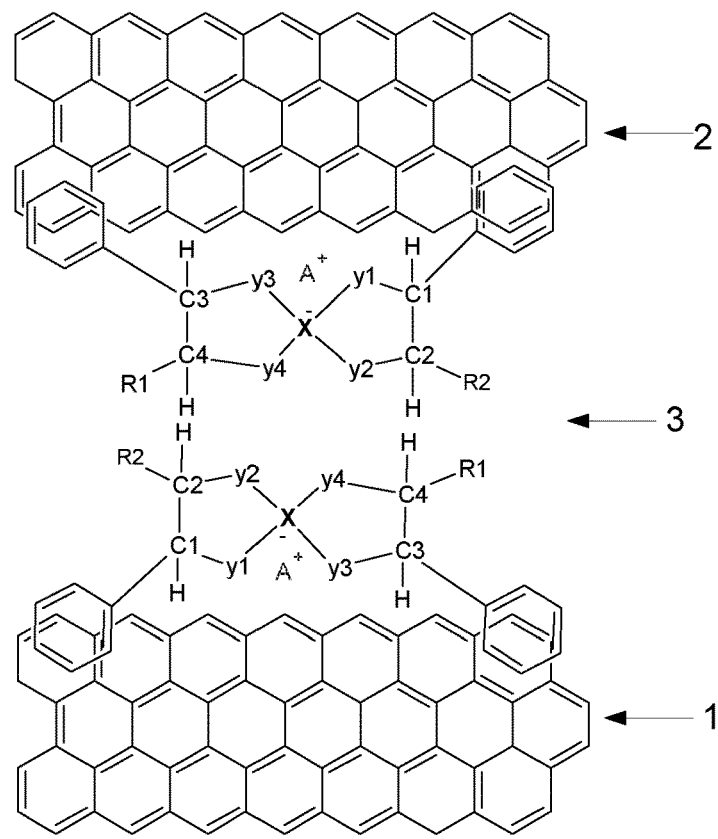
FIG. 4 shows a third embodiment of a hybrid ionic graphene nanocomposite.

FIG. 4 shows a third embodiment, in which cyclic planar rings of a first ionic compound of the ionic separating layer 3 forms a π-π-stacking interaction with the material of the first layer 1, and cyclic planar rings of a second ionic compound in the separation layer 3 interconnected through different interactions such as ionic, hydrogen bonding and van de Waals interactions with said first ionic compound in the layer, forms a π-π-stacking interaction with the material of the second layer 2. Preferably, the cyclic planar rings are benzene rings.

Figure 5:
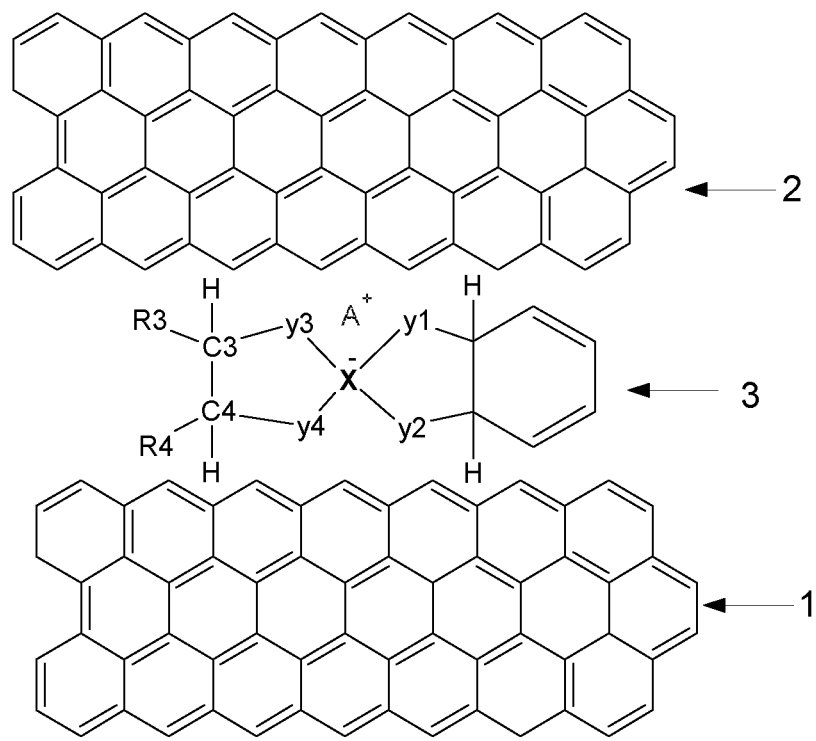
FIG. 5 shows a fourth embodiment of a hybrid ionic graphene nanocomposite.

FIG. 5 shows a fourth embodiment in which R1 and R2 forms a cyclic planar ring together with C1 and C2, wherein said cyclic planar ring forms π-π-stacking interaction with both the material of the first layer 1 and the material of the second layer 2. R3 and R4 do not form cyclic planar rings capable of forming π-π-stacking interaction with the materials of the first layer 1 and the second layer 2. Preferably, the cyclic planar ring is a benzene ring.

Figure 6:
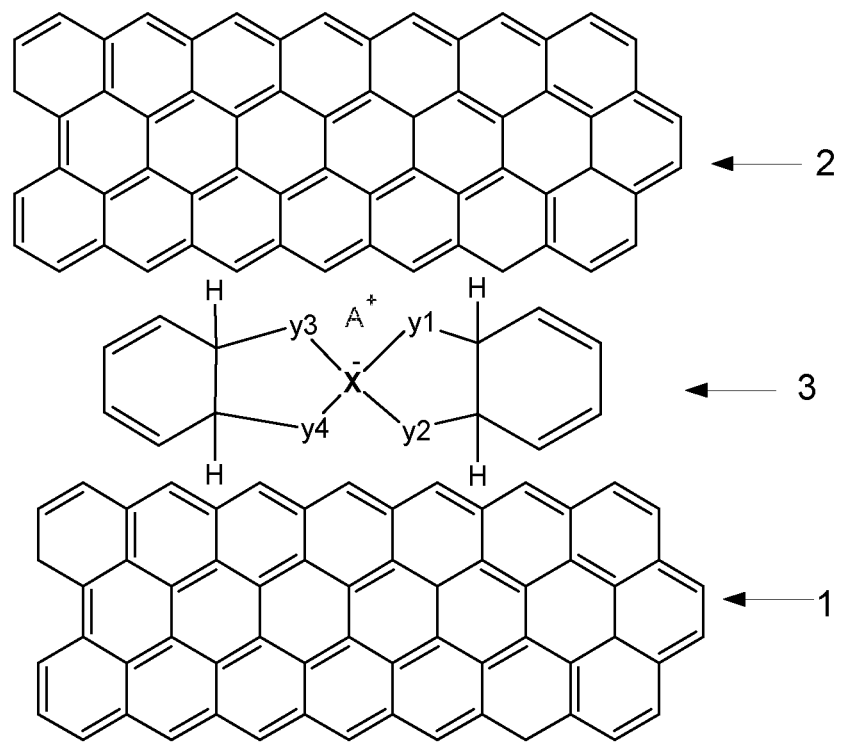
FIG. 6 shows a fifth embodiment of a hybrid ionic graphene nanocomposite.

FIG. 6 shows a fifth embodiment, in which R1 and R2 forms a first cyclic planar ring together with C1 and C2, wherein said first cyclic planar ring forms π-π-stacking interaction with both the material of the first layer 1 and the material of the second layer 2, and R3 and R4 forms a second cyclic planar ring together with C3 and C4, wherein said second cyclic planar ring forms π-π-stacking interaction with both the material of the first layer 1 and the material of the second layer 2. Preferably, said first and second cyclic planar rings are benzene rings.

EXAMPLES

In the following examples the following synthesis were used for preparing a graphene lithium bis(salicylato)borate (G[Li][BScB]) hybrid nanocomposite. This constitutes an illustrative example of composites falling under the scope of the present disclosure.

Synthesis of Lithium Bis(Salicylato)borate ([Li][BScB]) Salt

[Li][BScB] was synthesized by adding salicylic acid (24.86 g, 180 mmol) to an aqueous solution of anhydrous lithium carbonate (3.32 g, 45 mmol) and boric acid (5.56 g, 90 mmol) in 100 mL distilled water (all reagents were synthesis grade, from Sigma Aldrich). The solution was stirred for one hour at 60° C. A clear solution of [Li][BScB] salt was obtained and cooled down to room temperature. After rotary evaporation of water, the [Li][BScB] salt was washed with acetonitrile followed by filtration and drying to remove traces of unreacted reagents. The [Li][BScB] salt was purified at a yield of ca. 95%.

Synthesis of Graphene Lithium Bis(Salicylato)borate (G[Li][BScB]) Composite

A 50/50 water ethanol solution containing graphene in a concentration of 50 mg/ml was prepared, stirred and ultrasonicated for 30 min at room temperature. Another 50/50 water ethanol solution of ([Li][BScB]) with a concentration of 50 mg/ml was prepared. The graphene-containing solution was added dropwise to the salt solution under stirring at room temperature. Stirring continued for 1 hour after the complete addition of the graphene solution. After that, the solvents were rotary evaporated and a powder of a graphene lithium bis(Salicylato)borate (G[Li][BScB]) composite was obtained. The powder was dried under vacuum for 12 hours at 60° C.

SEM measurements were carried out on a cross section of the thus produced G[Li][BScB] films using a scanning electron microscope. The results showed that the thickness of the graphene layer was approximately 2-3 nm while the ionic layer had a slightly higher thickness of approximately 5 nm. The theoretical thickness of a single graphene layer is 0.345 nm. This means that a graphene layer in the composite with a thickness of approximately 3 nm contains approximately 9 single layers of graphene.

Figure 13:
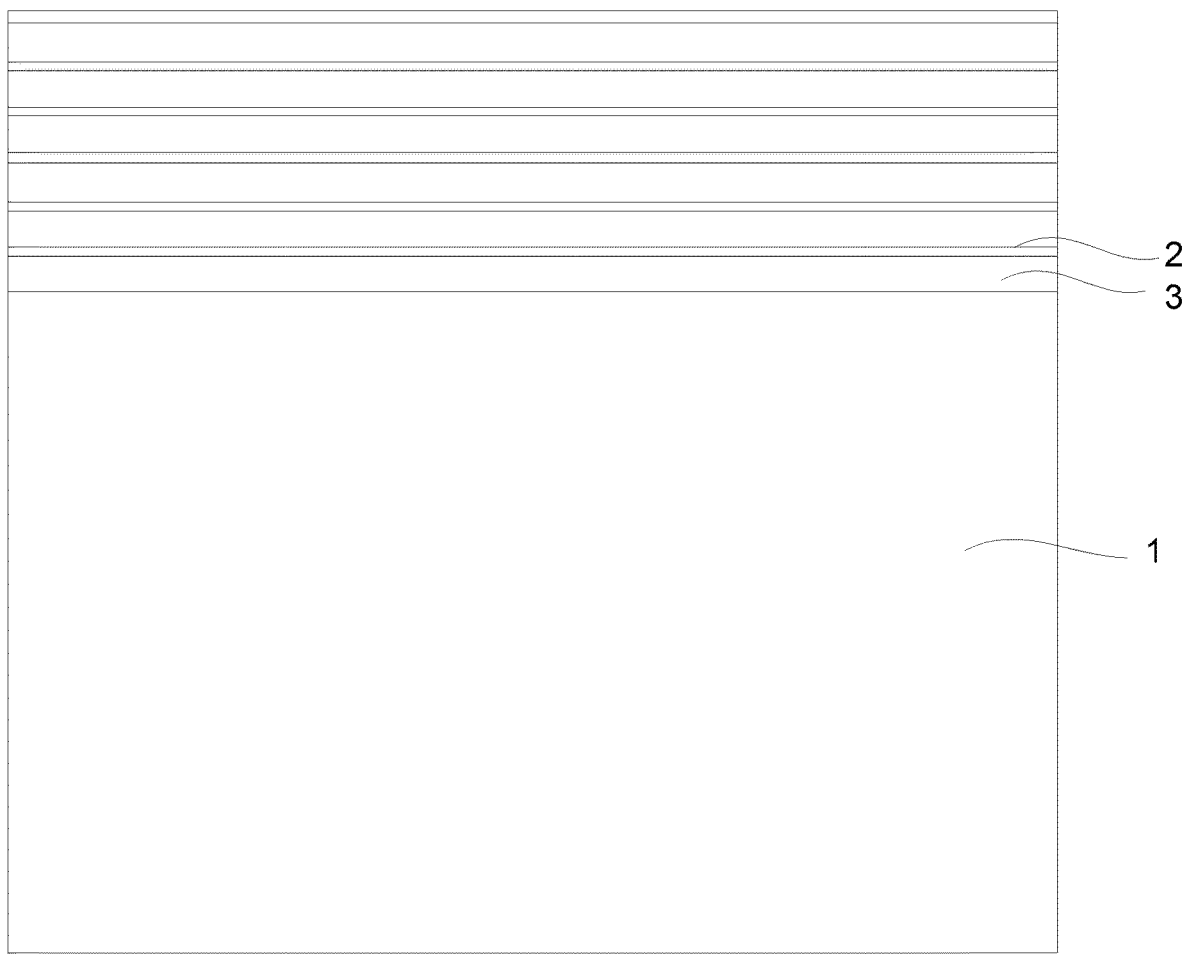
FIG. 13 is a schematic representation of a piece of material according to an embodiment.

FIG. 13 is a schematic representation of a piece of material according to one embodiment of the present invention, wherein the piece of material comprises a metallic alloy forming a substrate (first layer) 1 and a stack of second layers 2 and third layers 3 as defined in this disclosure arranged onto a surface of the substrate 1. Some of the test specimens used in the following examples to be presented had the principle design shown in FIG. 3.

Example 1

The thermal measurements were carried out using a Hot Disk® instrument (Hot Disk AB, Gothenburg, Sweden) with a custom-made cell and thermal conductivity sensor. The sensor was placed between two substrates that were coated with approximately 3 μm graphene lithium bis(salicylato) borate (G[Li][BScB]).

The substrates were made of 99.99% pure Cu and had a circular shape with a diameter of 12 mm, a thickness of approximately 1 mm and a surface roughness of 100-200 nm. Uncoated substrates were tested as a reference. Three measurements were performed and the average values with standard deviations are presented for different temperatures.

Figure 7:
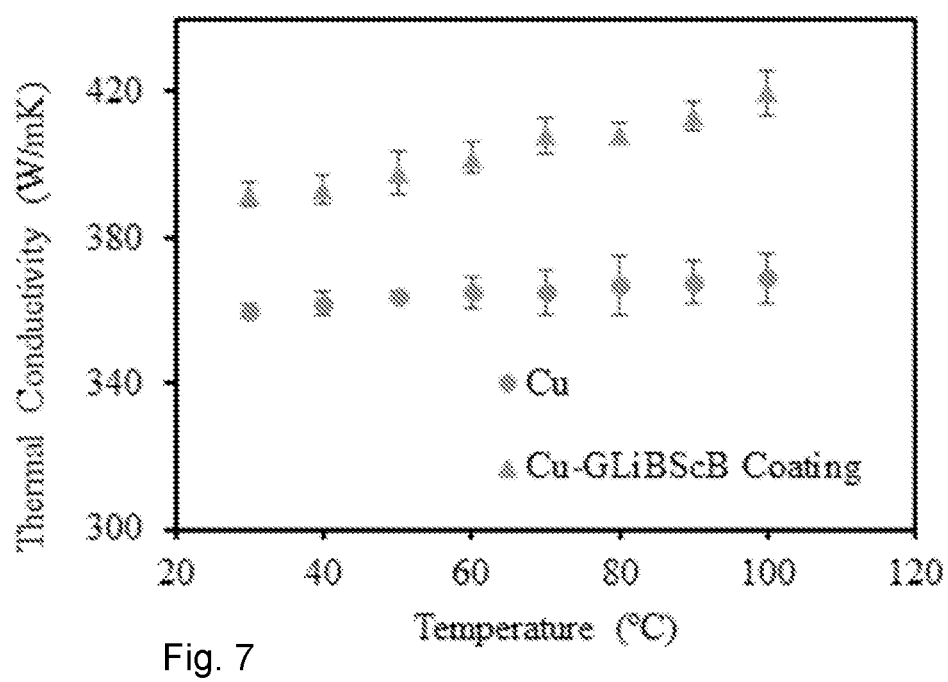
FIG. 7 is a diagram showing the thermal conductivity of copper with and without a graphene lithium bis(salicylato) borate (G[Li][BScB]) coating.

The results are presented in the diagram shown in FIG. 7. As can be seen, the thermal conductivity of the substrate coated with the (G[Li][BScB]) coating is remarkably higher than for the Cu reference samples, and the difference increases with increasing temperature. These results indicate the effects of the (G[Li][BScB]) coating on improving the thermal conductivity of pure Cu.

Example 2

Four samples of sintered pure Cu and were prepared by powder metallurgy as follows: Cu nanoparticles (average size of 200 nm) were washed three times with ethanol and dried under vacuum for 12 h at 120° C. to ensure the removal of impurities from the powder. After drying, the Cu powder was pressed under 600 MPa and sintered at 300° C. for 12 h under Ar atmosphere. Circular samples were prepared with a dimension of 12 mm, a thickness of approximately 1 mm, and a density of 95% of the theoretical density.

Additionally, four samples of sintered Cu containing 1 wt % of (G[Li][BScB]) were also prepared using the same powder metallurgy approach as above.

According to another aspect, there is a provided method of producing a metal-ionic graphene nanocomposite. The method comprises the addition of ionic graphene additive at the desired concentration to a suspension containing the metal nanoparticles (ethanol and Cu nanoparticles in this particular example). The method also comprises simultaneous stirring for the mixture at room temperature for at least 30 min.

The method also comprises evaporating the solvent (ethanol in this particular example) to obtain a metal-(G[Li][BScB]) powder. Solvent evaporation is followed by drying at temperature approximately 80° C. under vacuum to ensure the removal of solvent traces. After drying, the samples were prepared by pressing under 600 MPa followed by sintering at 300° C. for 12 h under Ar atmosphere. The samples are circular with dimensions of 12 mm and thickness of approximately 1 mm and a density of approximately 93% of the theoretical density. The layered structure of the (G[Li][BScB]) additive was maintained after the sintering process. The same protocol, applied in Example 1 for measuring the thermal properties, was applied here as well. The sensor was placed between two sintered discs and two measurements were performed at each temperature. The average value is calculated and the standard deviation is presented.

Figure 8:
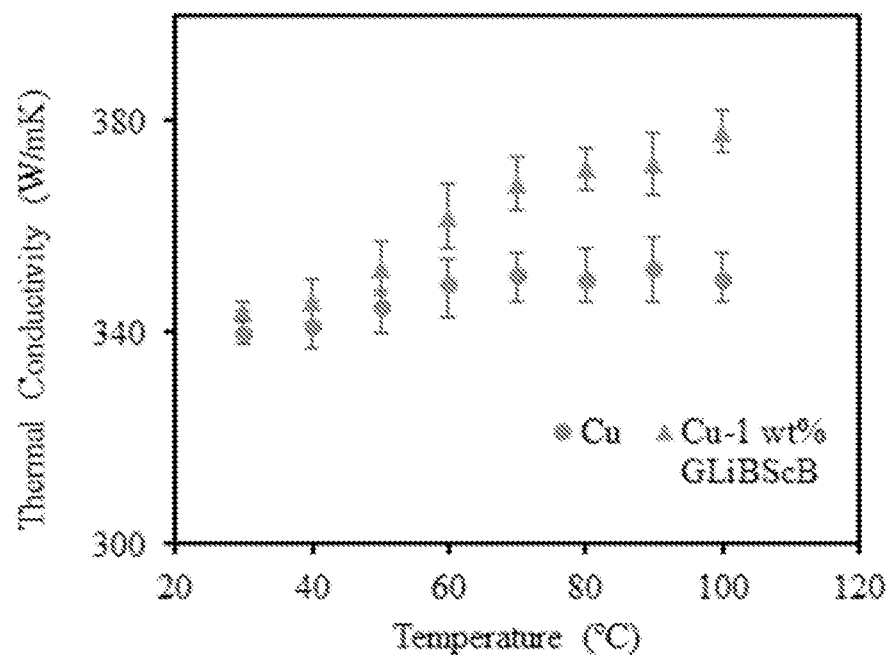
FIG. 8 is a diagram showing the thermal conductivity of sintered copper with and without a lithium bis(salicylato) borate (G[Li][BScB]) additive.

As can be seen in FIG. 8, the thermal conductivity of the samples provided with the (G[Li][BScB]) additive is remarkably higher than for the comparison samples, and the difference increases with increasing measuring temperature. The results indicate the effect of the (G[Li][BScB]) additive on improving the thermal properties of a Cu matrix.

Example 3

Samples comprising a silver substrate coated with a graphene Lithium Bis(salicylato)borate (G[Li][BScB]) were prepared as follows:

The substrate was made of 99.99% pure Ag and had a square shape with the dimensions 5×5 cm, a thickness of approximately 5 mm and a surface roughness of approximately 300 nm. An uncoated Ag substrate was tested as a reference. The coating was applied by dropwise adding an ethanol suspension containing 5 mg/ml (G[Li][BScB]) on the Ag substrate. After evaporating the EtOH, the coating was annealed at 80° C. for 2 h under Ar atmosphere.

The tribotests were performed using a CSM pin-on-disc tribometer under 2N load, 5 cm sec−1 speed and using pure Ag as a counter surface. Wear measurements were conducted by a tip cantilever profilometer.

Figure 9:
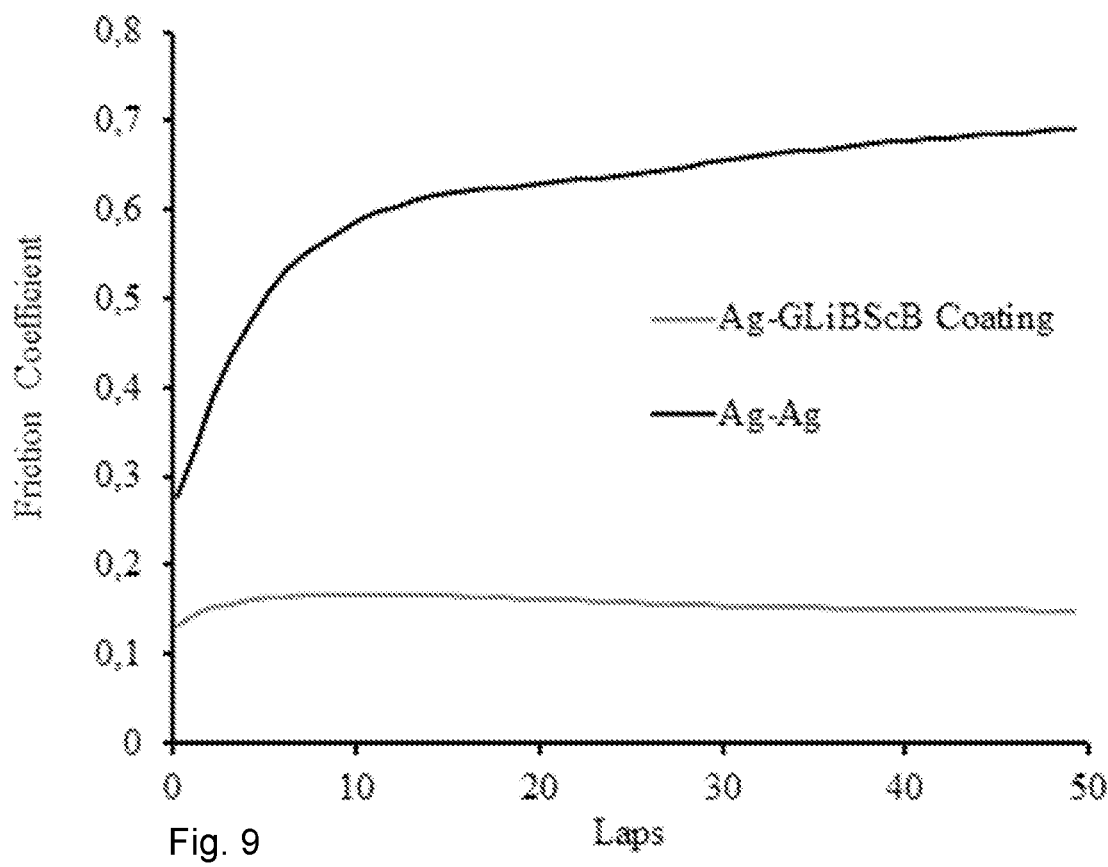
FIG. 9 is a diagram showing friction coefficients of uncoated Ag and Ag coated with a graphene lithium bis (salicylato)borate (G[Li][BScB]) coating. The tribotests were performed using a CSM pin-on-disc tribometer under 2N load, 5 cm $\text{sec}^{-1}$ speed and using Ag as a counter surface.
Figure 10:
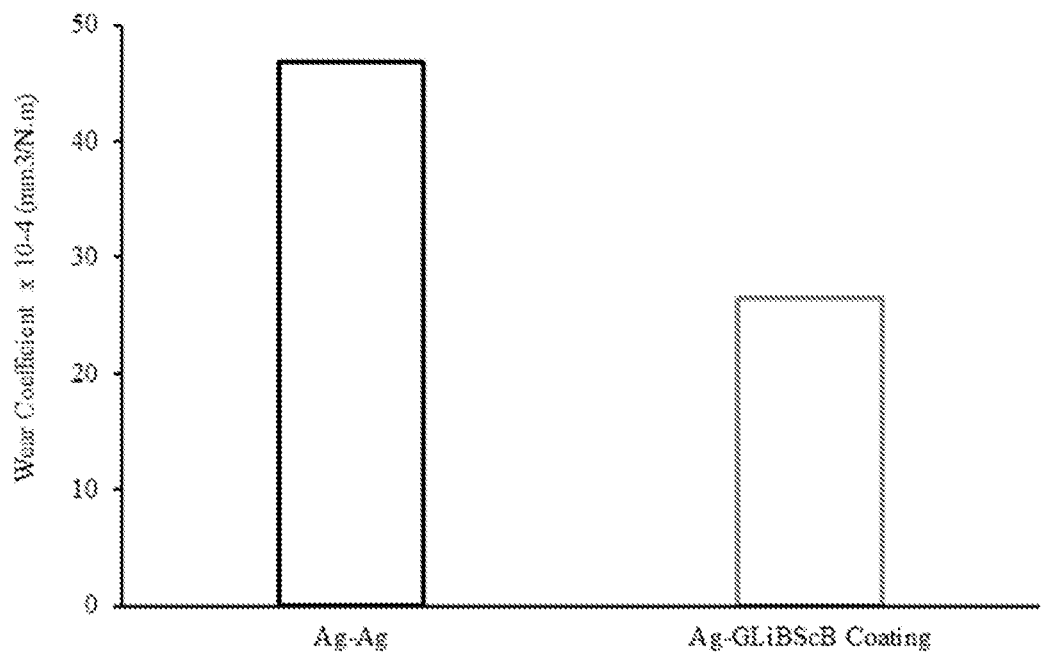
FIG. 10 is a diagram showing wear coefficients of uncoated Ag and Ag coated with a graphene lithium bis (salicylato)borate (G[Li][BScB]) coating. The tribotests were performed using a CSM pin-on-disc tribometer under 2N load, 5 cm sec−1 speed and using Ag as a counter surface.

The results are presented in the diagram shown in FIG. 9. As can be seen, the friction coefficient of the Ag-(G[Li][BScB])-on-Ag contact pair is remarkably lower than for the Ag—Ag contact pair. Further, as can be seen in FIG. 10, the wear coefficient of the Ag-(G[Li][BScB])-on-Ag contact pair is also remarkably lower than for the Ag—Ag contact pair.

Example 4

Samples comprising an aluminium substrate coated with a graphene lithium bis(salicylato)borate (G[Li][BScB]) coating were prepared and tested in the same way as in Example 3.

Figure 11:
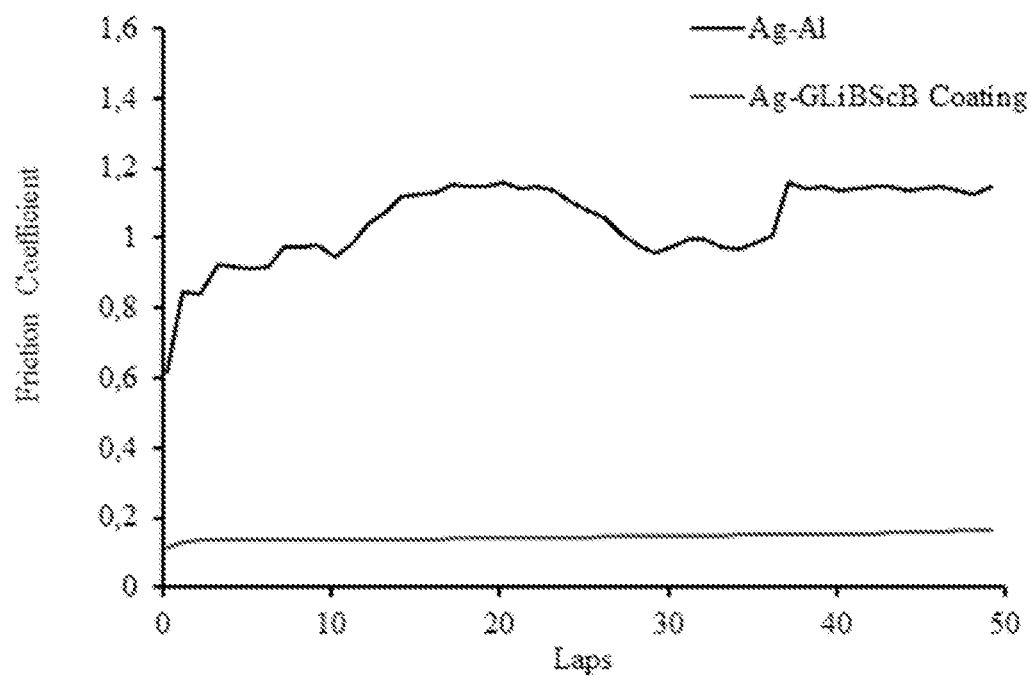
FIG. 11 is a diagram showing friction coefficients of uncoated Al and Al coated with a graphene lithium bis (salicylato)borate (G[Li][BScB]) coating. The tribotests were performed using a CSM pin-on-disc tribometer under 2N load, 5 cm sec−1 speed and using Ag as a counter surface.
Figure 12:
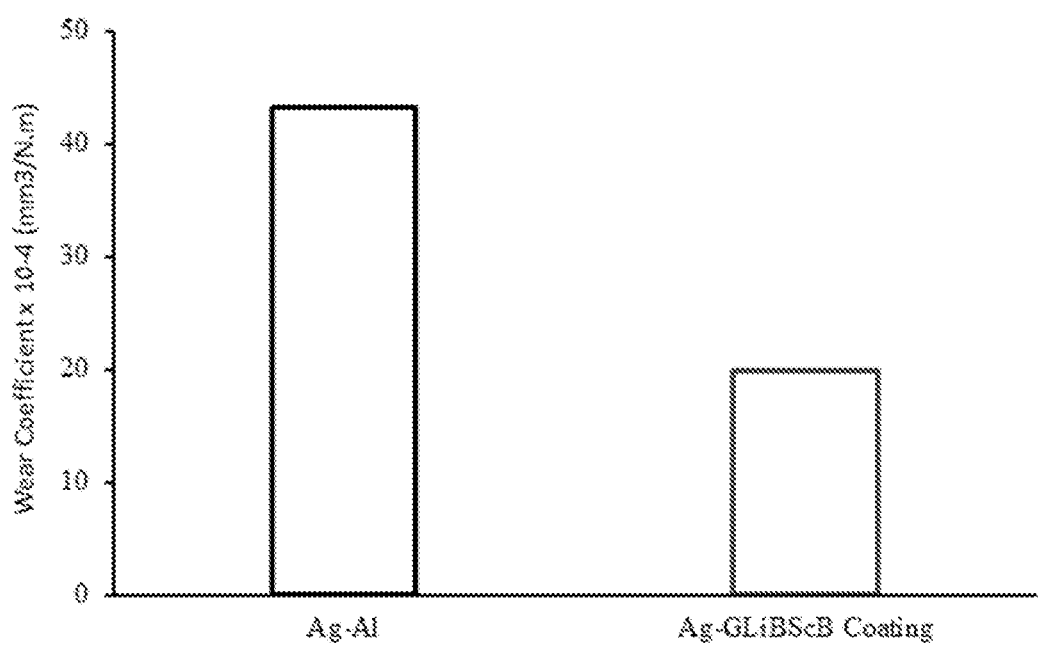
FIG. 12 is a diagram showing wear coefficients of uncoated Al and Al coated with a graphene lithium bis (salicylato)borate (G[Li][BScB]) coating. The tribotests were performed using a CSM pin-on-disc tribometer under 2N load, 5 cm sec−1 speed and using Ag as a counter surface.

The results are presented in the diagram shown in FIG. 11. As can be seen, the friction coefficient of the Ag-(G[Li][BScB])-on-Al is remarkably lower than that for Ag—Al contact pair. Further, as can be seen in FIG. 12, the wear coefficient of the Ag-(G[Li][BScB])-on-Al pair is remarkably lower than for the Ag—Al contact pair. This is an important advantage of the coating, and it shows that desirable properties of the multi-layered coating are indeed achieved.

Without further elaboration, it is believed that a person skilled in the art can, using the present description including the examples, utilize the present invention to its fullest extent. Also, although the invention has been described herein with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A nanocomposite material comprising a first layer, a second layer comprising a carbon-based material and an intermediate layer that separates and interconnects the first and second layers,
   wherein said carbon-based material comprises at least 50 atomic percent carbon, has a hexagonal lattice and wherein the second layer has a thickness of 1-20 times the size of a carbon atom,
   wherein the intermediate layer comprises a salt that has ions comprising at least two separate cyclic, planar groups that are capable of forming π-π-stacking interaction with at least the second layer.

2. The nanocomposite material according to claim 1, wherein the cyclic planar groups of said ions of said salt comprise at least one aromatic group.

3. The nanocomposite material according to claim 1, wherein each of said cyclic planar groups of said ions of said salt is an aromatic group.

4. The nanocomposite material according to claim 1, wherein the first layer comprises a carbon-based material and wherein each first and second layer has a thickness of 1-10 times the size of a carbon atom.

5. The nanocomposite material according to claim 1, wherein the thickness of the intermediate layer is below 20 nm.

6. The nanocomposite material according to claim 1, wherein the carbon-based material comprises at least 99 atomic percent (at. %) carbon.

7. The nanocomposite material according to claim 1, wherein the salt has the following formula:

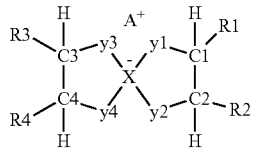

wherein
   X is any element from the periodic table that has the possibility to chelate resulting in an anionic nature;
   y1, y2, y3, y4 is any one of O, S, Si, C, N and P;
   R1, R2 are hydrocarbon chains, at least one of which is aromatic, or R1 and R2 form an aromatic ring with C1 and C2;
   R3, R4 are hydrocarbon chains, at least one of which is aromatic, or R3 and R4 form an aromatic ring with C3 and C4;
   H' is hydrogen or a carbonyl group;
   wherein the combination of X, H', y1, y2, y3, y4, R1, R2, R3, R4, C1, C2, C3 and C4 defines the anion of the salt; and
   A+ is any cation capable of forming a salt in combination with the anion.

8. The nanocomposite material according to claim 7, wherein not more than two H' are a carbonyl group, and that, if two H' are a carbonyl group, the carbonyl groups are located on C3 and C2 or on C4 and C1.

9. The nanocomposite material according to claim 7, wherein X is any of boron (B) or aluminium (Al).

10. The nanocomposite material according claim 7, wherein A is chosen from sodium (Na) and lithium (Li) and X is chosen from aluminium (Al) and boron (B).

11. A powder material comprising the nanocomposite material according to claim 1.

12. A sintered metallic product comprising a metal or metal alloy and the nanocomposite material according to claim 1.

13. The sintered metallic product according to claim 12, wherein the metal or metal alloy comprises Cu.

14. A material comprising metal powder and the nanocomposite material according to claim 1 in the form of a powder.

15. A material having a layered structure comprising the nanocomposite material according to claim 1,
   wherein the first layer is a substrate layer comprising a material other than said carbon-based material,
   the intermediate layer separates and interconnects the substrate layer and the second layer; and
   a plurality of layers comprising a carbon-based material on the second layer.

16. The material according to claim 15, wherein the first layer comprises a metal substrate comprising, as a main constituent, any one of the following metals, Au, Ag, Al, Cu, Fe, Ti, Ni, or a combination thereof.

17. A method of producing the nanocomposite material according to claim 1, the method comprising the steps of:
   preparing a first solution comprising of the carbon-based material and ethanol;
   preparing a second solution comprising of the salt and ethanol;
   adding the second solution to the first solution in a stepwise procedure; and
   drying the mixture of the first and second solution to evaporate solvents and thereby obtaining a powder of the nanocomposite material.

18. A nanocomposite material comprising a first layer, a second layer comprising a carbon-based material and an intermediate layer that separates and interconnects the first layer and second layer,
   wherein the carbon-based material comprises at least 50 atomic percent carbon, has a hexagonal lattice and has a thickness of 1-20 times the size of a carbon atom,
   wherein the intermediate layer comprises a salt of lithium bis(salicylato)borate [Li][BScB].

19. The nanocomposite material according to claim 18, wherein the second layer comprises graphene.

20. The nanocomposite material according to claim 18, wherein the first and second layer comprise graphene to form a graphene lithium bis(salicylato)borate (G[Li][BScB]) nanocomposite.

* * * * *